(12) United States Patent
Joffroy

(10) Patent No.: US 11,754,061 B2
(45) Date of Patent: Sep. 12, 2023

(54) HYBRID THERMODYNAMIC COMPRESSOR

(71) Applicant: BOOSTHEAT, Vénissieux (FR)

(72) Inventor: Jean-Marc Joffroy, Cabanes (FR)

(73) Assignee: BOOSTHEAT, Vénissieux (FR)

( * ) Notice: Subject to any disclaimer, the term of this patent is extended or adjusted under 35 U.S.C. 154(b) by 190 days.

(21) Appl. No.: 17/436,346

(22) PCT Filed: Mar. 6, 2020

(86) PCT No.: PCT/HR2020/050464
§ 371 (c)(1),
(2) Date: Sep. 3, 2021

(87) PCT Pub. No.: WO2020/178537
PCT Pub. Date: Sep. 10, 2020

(65) Prior Publication Data
US 2022/0178359 A1    Jun. 9, 2022

(30) Foreign Application Priority Data

Mar. 7, 2019 (FR) ...................................... 1902341

(51) Int. Cl.
*F04B 35/04* (2006.01)
*F03G 4/00* (2006.01)
(Continued)

(52) U.S. Cl.
CPC .............. *F04B 35/04* (2013.01); *F03G 4/045* (2021.08); *F04B 9/125* (2013.01); *F04B 9/1295* (2013.01);
(Continued)

(58) Field of Classification Search
CPC ........ F04B 35/01; F04B 9/125; F04B 9/1372; F04B 9/1295; F04B 2015/0818;
(Continued)

(56) References Cited

U.S. PATENT DOCUMENTS 2,157,229 A * 5/1939 Vannevar .................. F25B 9/14
60/517
3,413,815 A * 12/1968 Granryd .................. F25B 31/00
60/519
(Continued)

FOREIGN PATENT DOCUMENTS

| CA | 2 479 572 A1 | 10/2003 |
| EP | 0 373 792 A1 | 6/1990 |
| WO | 2014/202885 A1 | 12/2014 |

OTHER PUBLICATIONS

Eder et al., "Vuilleumier A Helium Pressurise," *Revue Pratique Du Froid Et Du Conditionnement D'Air*, PYC Edition SA., Paris, Fr., vol. 44, No. 684, Apr. 24, 1989, pp. 55-62.

*Primary Examiner* — Christopher S Bobish
(74) *Attorney, Agent, or Firm* — SEED INTELLECTUAL PROPERTY LAW GROUP LLP

(57) ABSTRACT

Hybrid thermodynamic compressor (8) for compressing a working fluid, the compressor comprising a volumetric cylinder (1) and a thermal cylinder (2) connected to one another mechanically by a connecting rod system (5) and pneumatically by a connecting circuit (12) optionally with a valve (4), a reversible electric machine (6), the volumetric cylinder comprising a first piston (81) that separates a first chamber (Ch1) from a second chamber (Ch2), the thermal cylinder comprising a second piston (82) which separates a third chamber (Ch3) from a fourth chamber (Ch4), which can be brought into thermal contact with a heat source (21) to thereby generate a cycled movement in the thermal cylinder, and concerning the connecting rod system (5), the first and second pistons are connected to a rotor (52) by first and second respective connecting rods (91,92), with a predetermined angular offset (θd), the volumetric cylinder being equipped with non-return valves (61,62), the power produced in the thermal cylinder being transmitted to the (Continued)

volumetric cylinder essentially via the connecting circuit and not via the rod system.

13 Claims, 6 Drawing Sheets

(51) Int. Cl.
    *F04B 39/00*     (2006.01)
    *F04B 17/00*     (2006.01)
    *F04B 35/01*     (2006.01)
    *F04B 19/24*     (2006.01)
    *F04B 9/125*     (2006.01)
    *F04B 9/137*     (2006.01)
    *F04B 19/22*     (2006.01)
    *F04B 9/129*     (2006.01)
    *F04B 15/08*     (2006.01)

(52) U.S. Cl.
    CPC ............ *F04B 9/1372* (2013.01); *F04B 17/00* (2013.01); *F04B 19/22* (2013.01); *F04B 19/24* (2013.01); *F04B 35/01* (2013.01); *F04B 39/0022* (2013.01); *F02G 2280/50* (2013.01); *F04B 2015/0818* (2013.01)

(58) Field of Classification Search
    CPC .......... F04B 17/00; F04B 19/24; F04B 19/22; F02G 2280/50; F03G 4/045
    See application file for complete search history.

(56) References Cited

U.S. PATENT DOCUMENTS

| | | | | |
|---|---|---|---|---|
| 3,788,772 | A * | 1/1974 | Noble | A61M 60/894 |
| | | | | 417/207 |
| 3,921,400 | A * | 11/1975 | Pitcher | F02G 1/0445 |
| | | | | 60/660 |
| 4,390,322 | A * | 6/1983 | Budzich | F04B 39/0005 |
| | | | | 417/267 |
| 6,098,404 | A * | 8/2000 | Armstrong | F04B 17/00 |
| | | | | 417/379 |
| 7,118,351 | B2 * | 10/2006 | Effenhauser | F04B 19/24 |
| | | | | 417/208 |
| 7,134,279 | B2 * | 11/2006 | White | F02G 1/0435 |
| | | | | 60/517 |
| 9,273,630 | B2 * | 3/2016 | Joffroy | F25B 9/14 |
| 9,273,681 | B2 * | 3/2016 | Joffroy | F25B 9/00 |
| 10,054,078 | B2 * | 8/2018 | Joffroy | F02G 1/0535 |
| 10,539,124 | B2 * | 1/2020 | Joffroy | F24D 11/0228 |
| 10,794,325 | B2 * | 10/2020 | Mlcek | F04B 9/123 |
| 2016/0348661 | A1 * | 12/2016 | Tognarelli | F02G 1/043 |

* cited by examiner

HYBRID THERMODYNAMIC COMPRESSOR

TECHNICAL FIELD

The invention relates to compressors for heat pump cycle, and concerns in particular a hybrid thermodynamic compressor which can be actuated by a thermal compressor and/or by a reversible electric machine. The invention also relates to hybrid boilers comprising such a hybrid thermodynamic compressor.

BACKGROUND AND PRIOR ART

In the known solutions, an electric motor is very often used to drive a compressor which compressor forms the motor element of a heat pump cycle.

There are also solutions based on a combustion engine for driving such a compressor.

Thus, generally the manufacturers of thermal equipment propose solutions allowing bringing thermodynamic solutions to the market with:
1. The electric heat pumps
2. The thermal heat pumps
3. The micro-cogeneration boilers The applicant company has also already proposed to use a thermodynamic compressor called "thermal compressor" of a new type to form the motor element of a heat pump cycle.

However, it appeared advantageous to be able to propose a more flexible solution according to the conditions of use of the heat pump circuit and the availability of different forms of energy to move the compressor. In particular, it is about being able, at certain times, to produce electrical energy from a thermal source as an auxiliary product (one therefore refers to "cogeneration"), and at other times, to use electrical energy without having recourse to the thermal source.

SUMMARY OF THE INVENTION

For this purpose, a hybrid thermodynamic compressor is proposed for compressing a working fluid, the compressor comprising at least:
one volumetric cylinder (1) and one thermal cylinder (2) connected to each other mechanically by a connecting rod system (5) and pneumatically by a connection circuit (12),
one reversible electric machine (6) connected to the connecting rod system (5),
the volumetric cylinder comprising a cylindrical enclosure with a first piston (81) which separates a first chamber (Ch1) from a second chamber (Ch2),
the thermal cylinder comprising a cylindrical enclosure with a second piston (82) which separates a third chamber (Ch3), called cold chamber, from a fourth chamber (Ch4), which can be brought into thermal contact with a heat source (21) to become a hot chamber, and thus generate a cycled movement in the thermal cylinder, the connection circuit connecting the second chamber with the third chamber,
and concerning the connecting rod system (5), the first piston is connected to a rotor (52) by a first connecting rod assembly (91), and the second piston is connected, directly or indirectly, to said rotor by a second connecting rod assembly (92), with a predetermined angular offset ($\theta d$) provided by the connecting rod system between the cycle of the first piston and the cycle of the second piston, the volumetric cylinder being equipped with an inlet path with a first non-return valve (61) and an outlet path with a second non-return valve (62), to deliver the working fluid at a second pressure (Pout), and in which the power produced in the thermal cylinder is transmitted to the volumetric cylinder essentially via the connection circuit and not via the connecting rod system.

Thanks to these arrangements, the volumetric cylinder allows pumping the working fluid in the context of a heat pump cycle, said volumetric cylinder being moved either by the effect of the thermal cylinder which is connected thereto and/or by supply of the electric machine.

It is noted, as will be seen below, that it is the same working fluid which can be used in the thermal cylinder and the volumetric cylinder as well as in the primary circuit of the heat pump.

It is also already noted that the volumetric cylinder can be a single-acting cylinder or a double-acting cylinder, as will be seen below.

It should be noted that the predetermined angular offset ($\theta d$) characterises the delay of the volumetric cycle relative to the thermal cycle and this predetermined angular offset can be any between 50° and 130°. Preferably, it can be obtained by mechanical construction, with, where appropriate, a possibility of mechanical adjustment.

The term "first non-return valve" designates herein the inlet valve of the compressor. The term "second non-return valve" designates herein the discharge valve of the compressor.

The clause "the power produced in the thermal cylinder is transmitted to the volumetric cylinder essentially via the connection circuit and not via the connecting rod system" must be understood as more than half of the power produced in the thermal cylinder flows through the fluid connection circuit, preferably more than 75% of the power produced in the thermal cylinder flows through the fluid connection circuit.

In various embodiments of the invention relating to the system, one and/or the other of the following arrangements, taken individually or in combination, can possibly be further used.

According to an advantageous option, the same working fluid could be used in the thermal cylinder and in the volumetric cylinder, preferably but not exclusively $CO_2$ can be selected as a working fluid. As a result, even if there are leaks at the segmentation of the first piston, there is no fluid mixture, because the same fluid is present on either side of this piston. Moreover, the same applies to the second piston. The sealing constraints between piston and cylinder sleeve are therefore much less critical than in the case of the use of two distinct fluids.

According to one arrangement, it is provided:
an electric compression mode in which the heat source is deactivated and the electric machine operates as a motor and
a thermal compression mode in which the heat source is activated and pulses a reciprocating cycle in the thermal cylinder, the movement of the first piston being imparted by the reciprocating movement of the working fluid in the connection circuit, and the electric machine operates as a generator.

It is noted that in each of the two modes, the connecting rod system transmits only an auxiliary portion of the thermodynamic power, and particularly in the thermal compression mode, the connecting rod system transmits only an auxiliary portion of the thermodynamic power while the major portion passes through the connection circuit.

According to a complementary option, a mixed mode can further be provided, in which the movement of the first piston in the volumetric cylinder is caused by the heat cycle supply in the first chamber and by the electric machine operating as a motor. A total arbitration flexibility is thus obtained between the thermal source and the electrical source and the arbitration can be done almost in real time.

According to one option, it is provided that the predetermined phase shift (θd) is comprised between 80° and 120°, preferably close to 95°, the volumetric cycle being in delay of this predetermined phase shift relative to the thermal cylinder. Such an offset allows obtaining optimum efficiency.

According to one option, the stroke (T1) of the first piston (81) can be greater than the stroke (T2) of the second piston (82). It is thus possible to balance the thermodynamic power generated in the thermal cylinder with the volumetric pumping power used in the volumetric cylinder and mainly according to the operating pressures.

According to another configuration, the stroke (T2) of the second piston (82) can be greater than the stroke (T1) of the first piston (81).

According to one configuration, the cubic capacity of the thermal cylinder can be comprised between 1 litre and 5 litres. According to one configuration, the cubic capacity of the volumetric cylinder can be comprised between 1 litre and 5 litres.

According to one configuration, the cubic capacity of the thermal cylinder can be greater than the cubic capacity of the volumetric cylinder. According to another configuration, the cubic capacity of the volumetric cylinder can be greater than the cubic capacity of the thermal cylinder.

According to one option, the following mechanical arrangement can be provided: the axis (Y1) of the volumetric cylinder and the axis (Y2) of the thermal cylinder are arranged substantially perpendicular to each other, and in which a complementary offset can be provided thanks to the position of the respective connecting crankpins of the first connecting rod assembly (91) of the second connecting rod assembly (92). Thanks to these arrangements, and to the angular offset close to 90°, it is possible to have a rotating rotor with respective crankpins for each cylinder at close, even identical, angular positions.

According to one option, called a "single-acting" volumetric compressor, the volumetric cylinder is used as a single-acting cylinder, and only the first chamber (Ch1) is used for sucking and discharging while the second chamber operates only in the reciprocating mode with the third chamber through the connection circuit (12), the inlet path with the first non-return valve (61) and the outlet path with the second non-return valve (62) being coupled to the first chamber.

According to one option, called "double-acting" volumetric compressor, the volumetric cylinder is used as a double-acting cylinder, with the connection circuit (12) which then selectively connects via a valve (4) the second chamber with the third chamber, and wherein a transfer passage (7) is provided from the first chamber to the second chamber, the first chamber being equipped with an inlet path with the first non-return valve (61), to admit the working fluid at a first pressure (Pin), the transfer passage comprising a buffer stock volume (3) with a third non-return valve (63) between the first chamber (Ch1) and the buffer stock and a fourth non-return valve (64) between the buffer stock and the second chamber (Ch2), the outlet path with the second non-return valve (62) being coupled to the second chamber.

Thanks to such a double-acting configuration, the compressor can provide a higher compression ratio if necessary. This configuration also allows benefiting from a stress relief on the segmentation.

According to a complementary arrangement of the two-stage configuration, when the connection circuit (12) is equipped with such a valve (4), in the electric compression mode, said valve (4) is closed, the heat source is deactivated and the electric machine operates as a motor and in the thermal compression mode, said valve (4) is open, the heat source is activated and pulses a reciprocating cycle in the thermal cylinder, the movement of the first piston being imparted by the reciprocating movement of the working fluid in the connection circuit, and the electric machine operates as a generator.

According to a complementary arrangement of the single-stage configuration, the connection circuit (12) can also be equipped with such a valve (4) with an identical operation with regard to the electrical and thermal modes.

According to a particular option, the piston rod of the volumetric cylinder can have a diameter greater than that of the piston rod of the thermal cylinder. Under these conditions, an effect of increasing the pressure can be observed linked to the reduction in surface area.

The present invention also concerns a thermodynamic boiler, for supplying/removing calories in/from a room of interest, comprising a hybrid thermal compressor as previously described, the thermal compressor forming the compression function of a reversible heat pump type loop comprising at least one general working fluid circuit, an expander and at least one outdoor unit.

According to a particular embodiment, the boiler in question can form a cogeneration machine with electricity production.

BRIEF DESCRIPTION OF THE DRAWINGS

Other aspects, aims and advantages of the invention will become apparent on reading the following description of an embodiment of the invention, given by way of a non-limiting example. The invention will also be better understood with reference to the accompanying drawings in which.

DESCRIPTION OF THE EMBODIMENTS

In the different figures, the same references designate identical or similar elements. For reasons of clarity of the presentation, certain elements are not necessarily represented to scale.

Overview, Compressor Heat Pump

Figure 8:
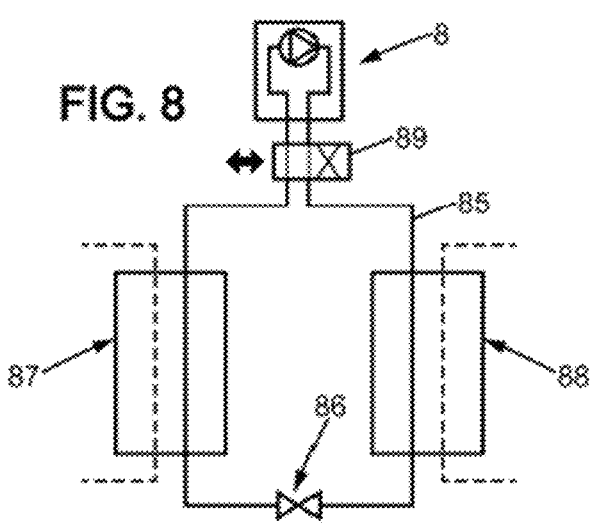
FIG. 8 illustrates a general schematic view of a reversible heat pump system.

FIG. 8 a heat pump system which comprises a hybrid thermal compressor 8 which will be described further in detail. The compressor 8 forms the compression function of a heat pump type loop, which may be reversible as illustrated herein or else non-reversible.

Such a heat pump system as illustrated herein comprises a heat transfer fluid circuit 85, a first heat exchanger 87 and a second heat exchanger 88, and an expander 86 which plays a reverse role of the compressor. In the case of a reversible system, the expander 86 can be doubled, each portion operative in one direction and inoperative in the other. A four-way valve 89 allows reversing the direction of circulation of the fluid in the exchangers and the expander. In a first configuration, the system takes calories from the first heat exchanger 87 and returns these calories to the second heat exchanger 88, and in the opposite configuration, the system takes calories from the second heat exchanger 88 and returns these calories to the first heat exchanger 87.

Particular interest is given to the case of a boiler incorporating a heat pump function, with calorie sampling on an outdoor unit and delivery of these calories in a room of interest or a house of interest.

In this case, the proposed system is based on a hybrid thermal compressor 8 which will be further described in detail, with a general working fluid circuit (or 'refrigerant'), an expander and at least one outdoor unit. The boiler comprises the hybrid thermal compressor 8 for the heat pump type loop and can also deliver calories to the room/house of interest from a burner.

Generally, the compressor is equipped with an inlet path with a first non-return valve 61 (called in the art "inlet valve") and an outlet path with a second non-return valve 62 (called in the art "discharge valve"). Relative to the primary circuit 85, the compressor sucks the working fluid through the inlet path at a first pressure Pin and delivers the working fluid at a second pressure Pout through the outlet.

Compressor—Overview—Volumetric and Thermal Cylinders

The hybrid thermal compressor 8 comprises a volumetric cylinder 1, a thermal cylinder 2 and a reversible electric machine 6, (M/G for: Motor Generator, both functions being possible).

As will be seen further, the volumetric cylinder 1 and a thermal cylinder 2 are interconnected mechanically by a connecting rod system 5 and pneumatically by a connection circuit 12.

With regard to the volumetric cylinder 1, it comprises a first piston denoted 81 which separates a first chamber denoted Ch1 from a second chamber denoted Ch2, which will be dealt with later. The first piston denoted 81 is displaced in a cylindrical sleeve 71 of revolution about a first axis Y1.

The volumetric cylinder 1 forms at least one volumetric type compressor stage for the primary circuit 85 of the heat pump system.

With regard to the thermal cylinder 2, it comprises a cylindrical enclosure with a second piston denoted 82 which separates a third chamber denoted Ch3, called cold chamber, from a fourth chamber denoted Ch4. The first piston denoted 81 is displaced in a cylindrical sleeve 72 of revolution about a second axis Y2.

The third chamber Ch3 can be cooled by a cooling circuit, symbolically represented in the figures by the reference 26.

The fourth chamber Ch4 can be brought into thermal contact with a heat source 21 to become a hot chamber, and thus generate a cycled movement in the thermal cylinder.

The third and fourth chambers Ch3, Ch4 are brought into fluid communication by a circuit external to the cylinder sleeve in which the second piston 82 is displaced. In particular, a regenerator 29 is provided which maintains a temperature gradient between the cold portion and the hot portion.

The axis Y2 is vertical with the fourth chamber disposed above the third chamber Ch3.

Outside the cylinder 72, a passage is provided allowing the fluid to flow from the third chamber to the fourth and vice versa. More specifically, at the top of the fourth chamber Ch4, there is provided an inlet outlet orifice of the fluid, denoted 23, then an annular passage 24 in the hot part up to the regenerator 29.

The passage continues below the regenerator through an annular passage 25 in the cold portion, a passage which opens from below into the cold chamber. At this location, the passage is also connected to an external inlet outlet orifice, denoted 27.

The constitution and operation of such a thermal regenerative compressor is described in the document WO2014/202885 issued by the applicant and the teachings of these documents will be resumed herein with regard to the principle and operation of such a thermal regenerative compressor.

The difference relative to this reference is that herein, in the cold chamber Ch3, there is not distinct suction inlet and discharge outlet, but a single coupling to the outside which successively sucks and discharges in a reciprocating movement of fluid in the connection circuit 12.

Thanks to the regenerator 29, the temperature difference between the fourth chamber Ch4 and the third chamber Ch3 remains greater than 500° C. Typically the fourth chamber is at a temperature close to 600° while the third chamber remains around 50° due to the effect of the cooling system. It is this temperature gradient, and its temporal maintenance, which actuates the thermal regenerative compressor.

The hot source 21 is a burner, for example a gas burner. However, it should be noted that the hot source can burn any other type of fuel in addition to gas. In other configurations, the hot source can be from a heat source of another type, solar or other, without combustion. A non-fossil fuel is preferred.

The connection circuit 12 selectively connects the second chamber Ch2 with the third chamber Ch3. A valve 4, optional in some cases as will be seen later, allows selectively closing or opening the fluid passage between the second chamber Ch2 and the third chamber Ch3. The valve 4 can be a solenoid valve or a manually operated valve.

It is noted that the connection circuit makes the working fluid flow between the second and third chambers Ch2, Ch3, in addition it is the same fluid which goes into the fourth chamber Ch4.

Furthermore, advantageously, it is also the same fluid which is used in the first chamber Ch1. It is noted that thanks to the use of a single fluid, even if there are leaks at the segmentation 78, this does not cause any problem except a very slightly affected performance, this consideration is true both for the thermal cylinder than for the volumetric cylinder.

It is also the same fluid which is used in the primary circuit 85 of the heat pump system discussed in FIG. 8.

In addition to the primary circuit 85, there may be auxiliary circuits (represented partially and in dotted lines in FIG. 8) coupled by heat exchangers but without any physical exchange of fluid.

A gas can be selected as a working fluid, preferably but not exclusively, CO2 (R744 in the jargon of heating/refrigeration engineers). However, the principle of the present invention can be applied to other working fluids.

Connecting Rod System and Mechanical Arrangement

Figure 1:
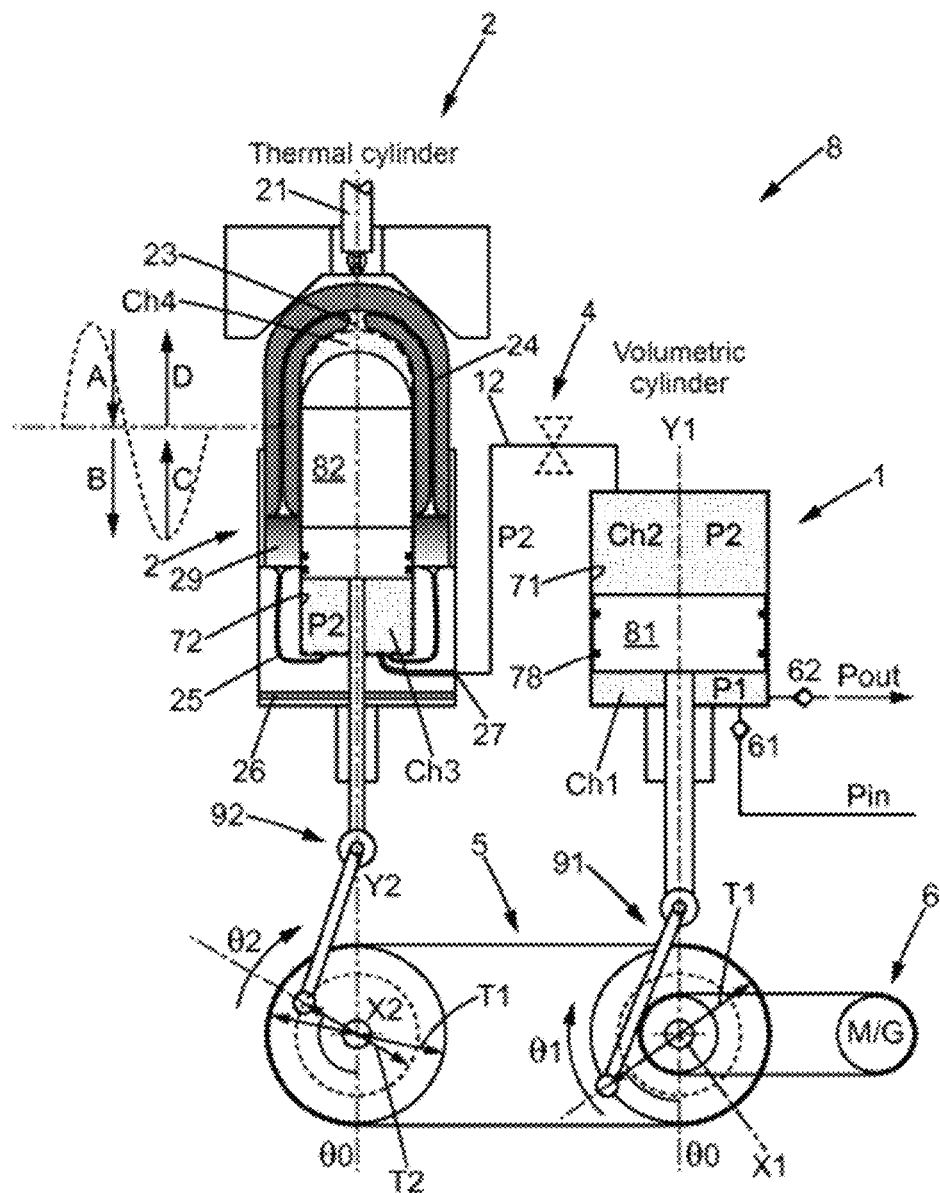
FIG. 1 represents a diagram of a hybrid thermal compressor according to the present invention, in a single-stage pumping version, the components being represented schematically flat.

FIG. 1 represents a schematic flat diagram of a thermal compressor, in a single-stage pumping version. The components are represented schematically flat therein for ease of understanding. For the sake of understanding, two rotors linked in rotation, respectively of axis X1 and X2, have been represented.

Figure 3:
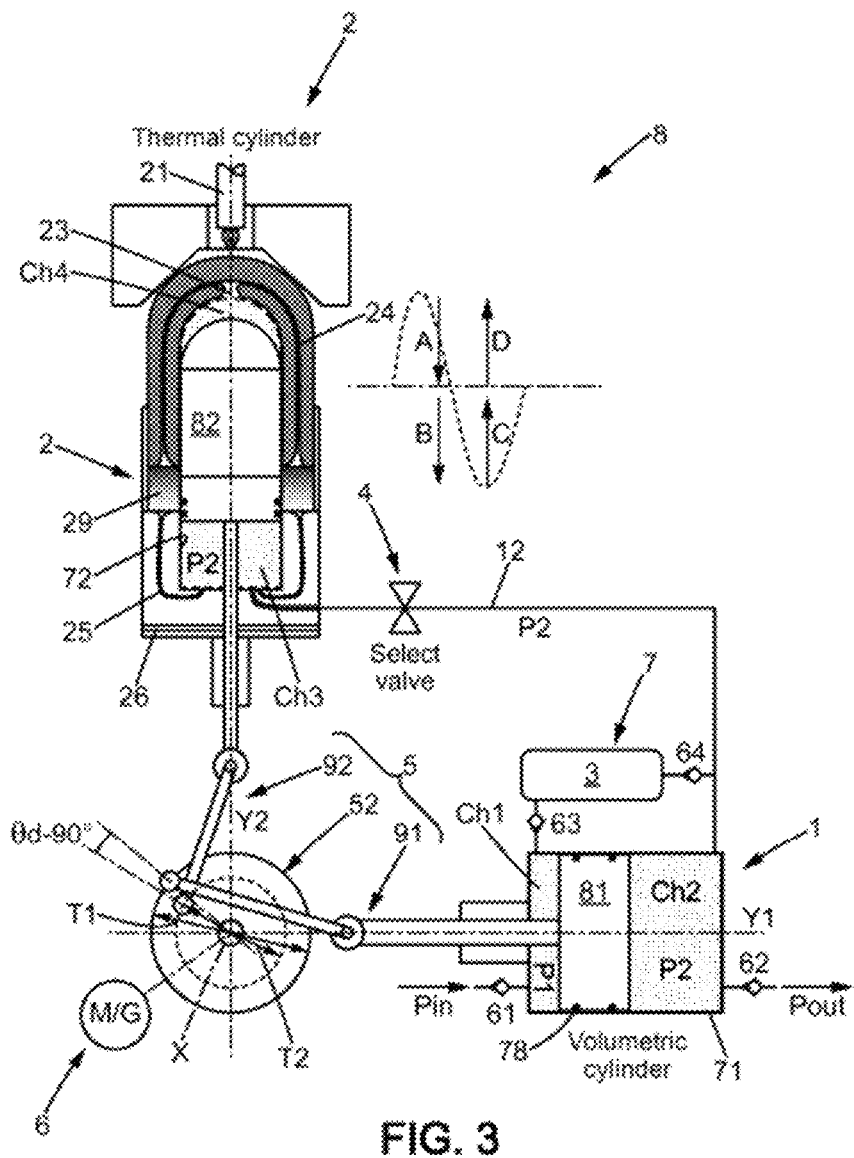
FIG. 3 represents a constructional embodiment of the compressor with the thermal cylinder disposed perpendicular to the volumetric cylinder.
Figure 4:
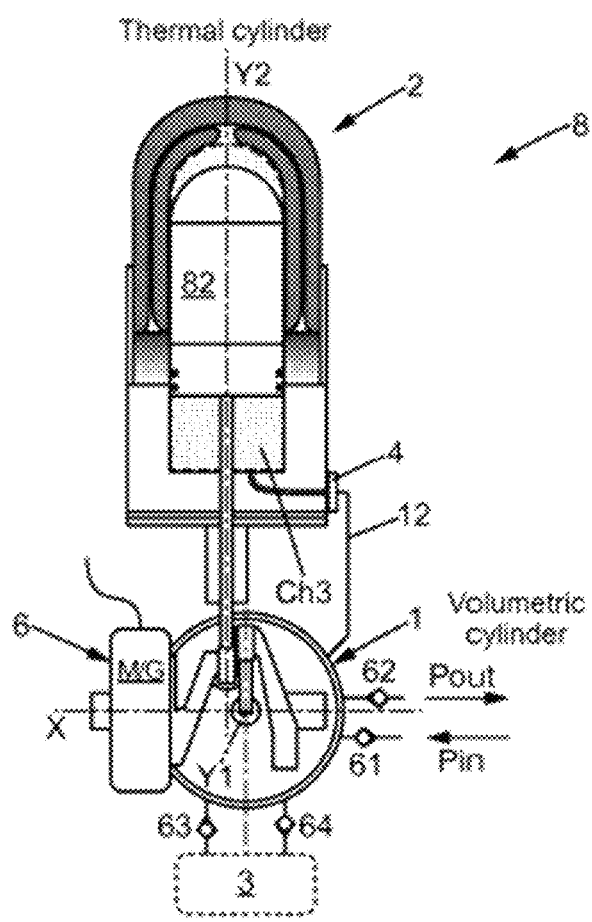
FIG. 4 represents an embodiment similar to that of FIG. 2 seen from the connecting rod system and in the direction of the volumetric cylinder.

FIGS. 3 and 4 represent more realistic configurations in terms of industrial solution.

The connecting rod system 5 mechanically interconnects the volumetric cylinder 1 and the thermal cylinder 2.

In this first example (FIG. 1) the volumetric cylinder is used as a single-acting cylinder. Only the first chamber Ch1 is used to suck and discharge the fluid into the primary circuit 85. The second chamber operates only in the reciprocating mode with the third chamber through the connection circuit 12. The valve 4 may be absent.

The inlet path with the first non-return valve 61 and the outlet path with the second non-return valve 62 are both coupled to the first chamber Ch1.

Compressor—Connecting Rod System

The connecting rod system 5 comprises a rotor 5 which is rotatably mounted on a compressor casing about the axis X. This rotor 5 forms a crankshaft, but transmits little mechanical effort, unlike a conventional crankshaft.

This rotor 5 is formed as a rotating portion with cranks; more specifically, crankpins are disposed at a distance from the axis X. A first crankpin is fastened on the rotor at a distance T1/2 from the axis X; on this first crankpin is fixed the foot of a first connecting rod 91. A second crankpin is fastened on the rotor at a distance T2/2 of the axis X; on this second crankpin the foot of a second connecting rod 92 is fastened.

The first connecting rod 91 is connected by the head thereof to a first rod secured to the first piston 81. The second connecting rod 92 is connected by the head thereof to a second rod secured to the second piston 82.

T1 is therefore the stroke of the first piston 81. The cubic capacity of the volumetric cylinder is T1×S1, S1 being the section of the first sleeve 71.

T2 is therefore the stroke of the second piston 82. The cubic capacity of the thermal cylinder is T2×S2, S2 being the section of the second sleeve 72.

At the bottom dead centre of the first piston, the residual volume of the first chamber Ch1 is very small, less than 5% of the cubic capacity, preferably less than 2% of the cubic capacity.

At the top dead centre of the first piston, the residual volume of the second chamber Ch2 can also be small, less than 5% of the cubic capacity, preferably less than 2% of the cubic capacity.

However, in a particular single-stage configuration, as the second chamber Ch2 is not used for the volumetric compression function, the residual volume of the second chamber Ch2 at the top dead centre of the first piston may be smaller, for example between 5% and 15% of the cubic capacity.

At the bottom dead centre of the second piston 82, the residual volume of the third chamber Ch3 is very small, less than 4% of the cubic capacity, preferably less than 2% of the cubic capacity. At the top dead centre of the first piston, the residual volume of the fourth chamber Ch4 is also very small, less than 4% of the cubic capacity, preferably less than 2% of the cubic capacity.

The first piston is connected to the rotor by the first connecting rod assembly 91, in FIG. 1, with a current position denoted θ1 relative to the bottom dead centre reference position denoted θ0.

The second piston is connected (indirectly via a belt in the schematic "flat" case of FIGS. 1 and 2) to the rotor by the second connecting rod assembly 92, with a current position denoted θ2 relative to the bottom dead centre reference position denoted θ0.

In Figures, the rotation occurs in a clockwise direction for the two connecting rod assemblies. The volumetric cycle 1 in delay by a certain angle relative to thermal cylinder 2.

The presence of an angular offset denoted θd between the cycle of the first piston and the cycle of the second piston is observed.

This angular offset θd is predetermined and is inherently provided by the linkage system. The predetermined phase shift Od will generally be selected to be comprised between 80° and 120°. The inventors have discovered that the optimum is close to 95°, the volumetric cycle being in delay of this predetermined phase shift relative to the thermal cylinder. Such an offset allows obtaining an optimum efficiency.

In FIGS. 3 and 4, the second connecting rod assembly 92 of the second piston 2 is connected directly to the single rotor 52, just like the first connecting rod assembly 91. The axis Y1 of the volumetric cylinder and the axis Y2 of the thermal cylinder are arranged perpendicular to each other.

Whereby, with this right angle arrangement, one can have a rotating rotor with respective crankpins for each cylinder at close or even identical angular positions, with a complementary offset of the crankpins which is then expressed in the form θd—90 (see FIG. 3).

Generally, there is a real angular offset close to 90° and therefore the physical offset of the first and second crankpins remains relatively small, thus the machining of such a part remains conventional and at controlled cost.

In a variant, instead of having a part with conventional cranks, it is possible to have two eccentrics associated with each other and adjustable in the angular position relative to each other in order to be able to adjust the predetermined angular offset Od depending on the application.

Pneumatic Circuit—Single-Stage

In the single-stage version, in FIG. 1, that is to say in single-acting, only the first chamber Ch1 is used to suck and discharge. The first non-return valve 61 is arranged on the inlet path and the outlet channel with the second non-return valve 62, both are coupled to the first chamber.

In single-acting, the second chamber Ch2 operates only in the reciprocating mode with the third chamber Ch3 through the connection circuit 12.

In this configuration, the first chamber Ch1 sucks in the working fluid through the inlet path at a first pressure Pin and delivers the working fluid at a second pressure Pout through the outlet path.

Two-Stage

In this configuration (see FIGS. 2 and 3), the two chambers of the volumetric cylinder are being used to raise the pressure from Pin to Pout.

A transfer passage 7 connects the first chamber Ch1 to the second chamber Ch2. The first chamber is equipped with the inlet path with the first non-return valve 61 already mentioned, to admit the working fluid at a first pressure Pin.

It is the second chamber Ch2 to which the outlet path is connected with the second non-return valve 62.

The transfer passage 7 comprises a buffer stock volume 3. The transfer passage comprises a third non-return valve 63 for transferring the fluid from the first chamber Ch1 to the buffer stock 3 and a fourth non-return valve 64 for transferring the fluid from the buffer stock 3 to the second chamber Ch2. The outlet path with the second non-return valve 62 is connected to the second chamber.

The buffer stock 3 has a sufficient volume so that the volume introduced and withdrawn during a cycle of one revolution of the rotor represents an amount of fluid of at most 10% of the volume present in the buffer stock 3.

Operation and Control

The compressor is referred to as a "hybrid"; indeed, it can operate according to at least the following two operating modes, electric and thermal.

Electric mode: this is an electric compression mode in which the heat source 21 is deactivated, the electric machine operates as a motor and the valve 4 (if it is present) is closed. In this electric mode, there is no power produced in the thermal cylinder. It should be noted that the thermal cylinder 2 does not have a significant brake, the second piston operates in simple displacer mode.

Thermal and cogeneration mode: this is a thermal compression mode in which the valve 4 is open (if present), the heat source 21 is activated and pulses a reciprocating cycle in the thermal cylinder 2, the movement of the first piston 81 being imparted by the reciprocating movement of the working fluid in the connection circuit, and in which the connecting rod system 5 transmits only an auxiliary portion of the thermodynamic power and the electric machine operates as a generator.

In this configuration, the power produced in the thermal cylinder 2 is transmitted to the volumetric cylinder 1 essentially via the connection circuit 12 and not via the connecting rod system 5. Typically, more than 60% of the power produced in the thermal cylinder 2 can be transmitted to the volumetric cylinder 1 through the connection circuit 12.

According to one configuration, the control logic can impose a binary choice, namely exclusively either the electric mode or the thermal mode.

According to another configuration, the control logic can use a mixed mode with any contribution from the thermal source and the electrical source. It is thus possible to take advantage of a local electric surplus supplemented by calories from the thermal source, all this in order to move the compressor.

Figure 2:
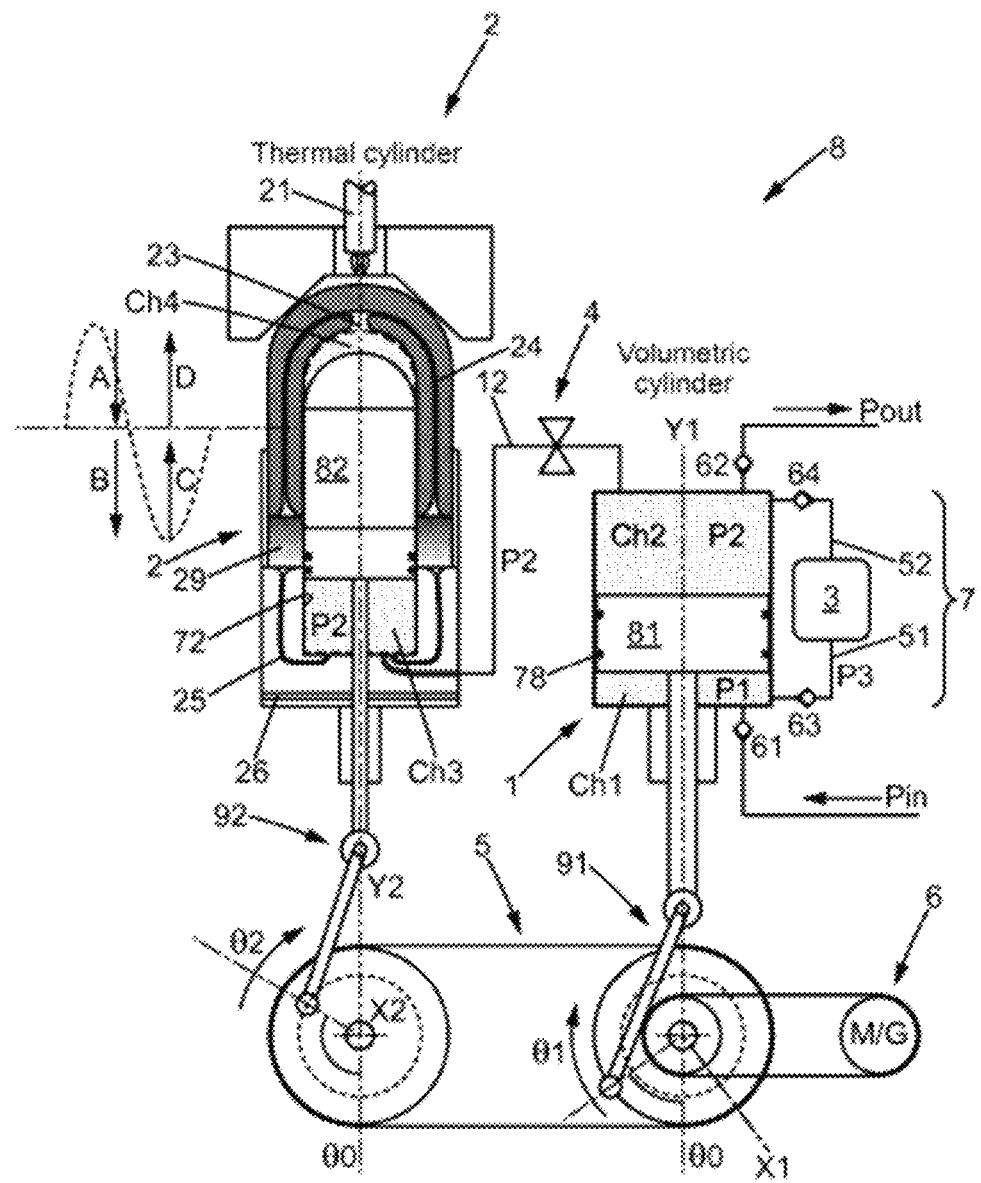
FIG. 2 represents a view similar to that of FIG. 1 in a two-stage volumetric compressor variant.
Figure 6:
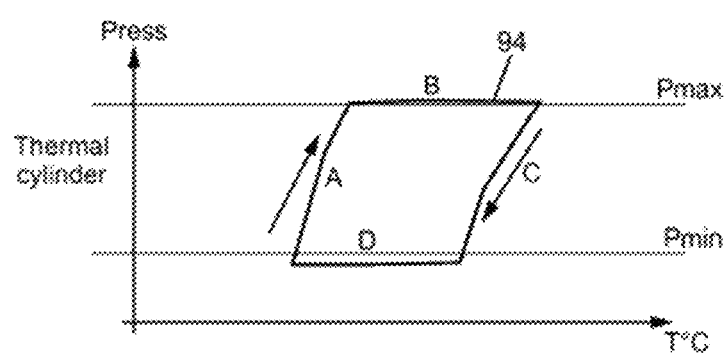
FIG. 6 represents a thermodynamic cycle diagram of the thermal cylinder.

FIG. 6 illustrates the thermodynamic operation of the thermal regenerative compressor. The different phases A, B, C, D each illustrate a displacement in the pressure versus temperature diagram. The different phases A, B, C, D each correspond to a quarter of a cycle of the second piston as illustrated in FIGS. 1, 2 and 3.

As explained in more detail in the aforementioned document WO2014/202885, the surface embraced by the curve 94 (ABCD cycle) of FIG. 6 represents the thermodynamic work provided by the thermal cylinder 2.

Figure 5:
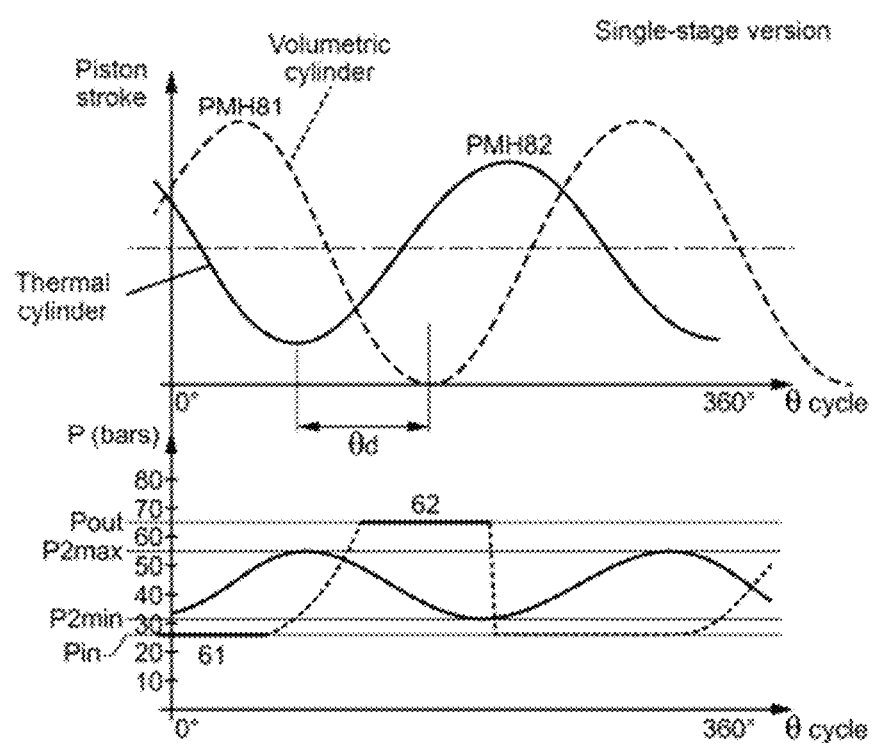
FIG. 5 represents a cycle diagram with the pressures and the strokes on the ordinate, for the single-stage version.

In FIG. 5, which considers a steady state in a single-stage configuration, the stroke and pressure diagram shows that the pressure P2 in the thermal cylinder 2 evolves between P2min when the temperature of the fluid is at its minimum in thermal cylinder 2 and P2max when the fluid temperature is at its maximum. Pmax is reached in the vicinity of the bottom dead centre of the piston 82. Pmin is reached in the vicinity of the top dead centre of the piston 82.

In the single-stage, the pressures Pmin and Pmax do not have a constraint relationship relative to the pressure values Pin and Pout.

In the thermal mode, the thermal power and therefore the amplitude P2max—P2min, as well as the section and the stroke of the piston are dimensioned so that the thermal power is greater than or equal to the pumping power to be developed in the volumetric cylinder 1.

That is to say: W2>W1, where

W1 represents the pumping power developed in the volumetric cylinder 1 and W2 represents the thermodynamic power developed in the thermal cylinder 2. The power generated by the thermal cylinder is proportional to its average pressure (P2max+P2min)/2.

If W6 expresses the motive power of the electric machine 6, then in the thermal mode, it can be express: W1=W2+W6, And by virtue of W2>W1, we have W6 negative, and therefore the electric machine 6 which operates as a generator. W6 represents the power of cogeneration.

In the electric mode, W2=0 (source 21 stopped and valve 4 closed) and it is the electric machine 6 which operates as a motor and consequently W1=W6. The controller of the electric machine adjusts the control signals to reach a speed setpoint value, for example on the operation of the volumetric cylinder 1.

In the single-stage configuration, the valve 4 may or may not be present. In the electric mode, the chambers Ch3 and Ch4 can be used as compensation chambers in relation to the second chamber Ch2. Otherwise we can also provide a sufficient residual volume of Ch2 at the top port point of the first piston 81.

Figure 7:
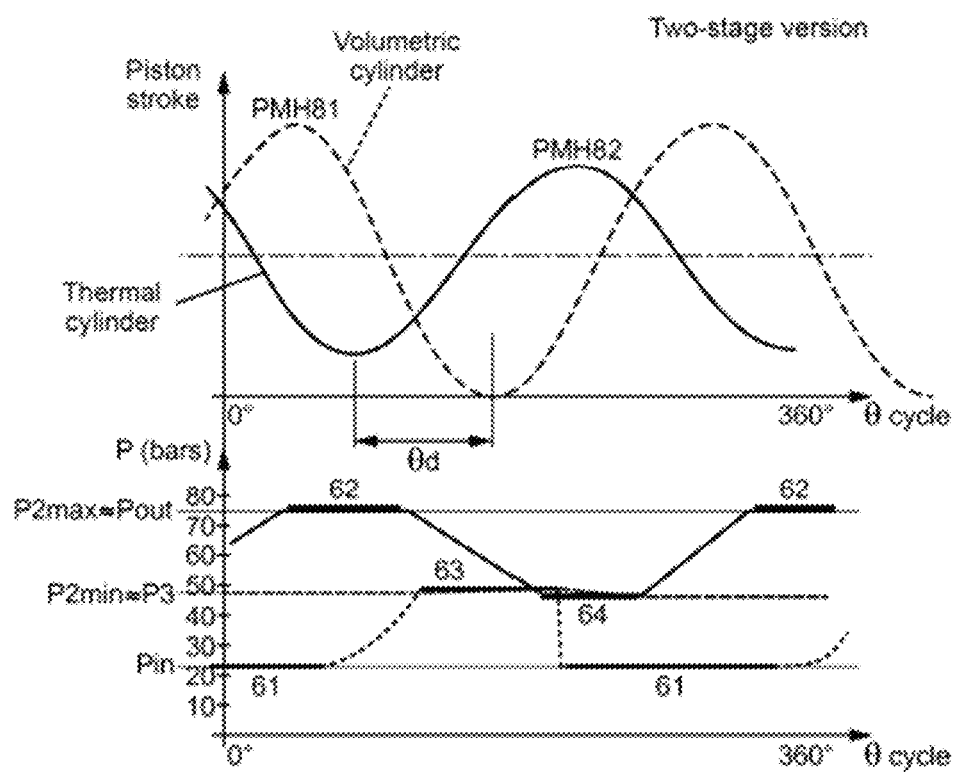
FIG. 7 represents a cycle diagram with the pressures and the strokes on the ordinate, for the two-stage version.

In FIG. 7, which considers a steady state in the two-stage configuration, the stroke and pressure diagram shows that the pressure P3 is relatively stable. The pressure P2max corresponds substantially to the pressure Pout. The pressure P2min substantially corresponds to the pressure P3.

The pressure P1 evolves between Pin and P3. The pressure P2 evolves between P3 and Pout.

FIG. 7 illustrates the sequential openings of the four non-return valves 61,62,63,64. The opening of each valve is represented in FIG. 7 by a thick horizontal line associated with the valve number.

A sequential opening of the valves 61 then 62 then 63 then 64 is observed, with a temporal overlap which can be greater or lesser according to the respective calibrations of the non-return valves.

At the top of the Figure, the respective positions of the pistons 81, 82 show the predetermined angular offset θd, with herein a delay of 90° C. of the volumetric cylinder.

On the example of FIG. 7, Pin is close to 25 bars, P3 is close to 50 bars, Pout is close to 75 bars.

On the example of FIG. 5, Pin is close to 25 bars, Pout is close to 65 bars.

Other Considerations

In general, for the pressures, Pin is typically comprised between 15 and 40 bars and Pout is typically between 60 and 90 bars.

The cubic capacities can be selected depending on the power requirement. In some typical cases, the cubic capacity of the thermal cylinder can be comprised between 1 litre and 5 litres. According to one configuration, the cubic capacity of the volumetric cylinder can be comprised between 1 litre and 5 litres.

In some typical cases, the stroke T1 is greater than T2. In some other typical cases, the section S1 is greater than S2.

In some typical cases, the buffer stock volume 3 can be comprised between 10 litres and 25 litres.

it is noted that in the two-stage version, the sealing stresses at the segmentation 78 can be released because the average pressures on either side of the piston 81 are equal.

The invention claimed is:

1. A hybrid thermodynamic compressor for compressing a working fluid, the compressor comprising:
   one volumetric cylinder and one thermal cylinder connected to each other mechanically by a connecting rod system and pneumatically by a connection circuit; and
   one reversible electric machine connected to the connecting rod system, the volumetric cylinder comprising a cylindrical enclosure with a first piston which separates a first chamber from a second chamber,
   the thermal cylinder comprising a cylindrical enclosure with a second piston which separates a third chamber, called cold chamber, from a fourth chamber, which can be brought into thermal contact with a heat source to become a hot chamber, and thus generate a cycled movement in the thermal cylinder, the connection circuit connecting the second chamber with the third chamber,
   wherein the first piston is connected to a rotor by a first connecting rod assembly, and the second piston is connected, directly or indirectly, to said rotor by a second connecting rod assembly, with a predetermined angular offset provided by the connecting rod system between a cycle of the first piston and the cycle of the second piston,
   the volumetric cylinder being equipped with an inlet path with a first non-return valve and an outlet path with a second non-return valve, to deliver the working fluid at a second pressure,
   and wherein the power produced in the thermal cylinder is transmitted to the volumetric cylinder essentially via the connection circuit and not via the connecting rod system.

2. The hybrid thermodynamic compressor according to claim 1, wherein the same working fluid is used in the thermal cylinder and in the volumetric cylinder.

3. The hybrid thermodynamic compressor according to claim 1, wherein:
   in an electric compression mode, the heat source is deactivated and the electric machine operates as a motor and
   in a thermal compression mode in which the heat source is activated and pulses a reciprocating cycle in the thermal cylinder, the movement of the first piston being imparted by the reciprocating movement of the working fluid in the connection circuit, and in which the connecting rod system transmits only an auxiliary portion of the thermodynamic power and the electric machine operates as a generator.

4. The hybrid thermodynamic compressor according to claim 3, wherein in a mixed mode, the movement of the first piston in the volumetric cylinder is caused by the heat cycle supply in the first chamber and by the electric machine operating as a motor.

5. The hybrid thermodynamic compressor according to claim 1, wherein the predetermined angular offset is between 80° and 120°, the volumetric cylinder first piston cycle being in delay of this predetermined offset phase shift relative to the thermal cylinder second piston.

6. The hybrid thermodynamic compressor according to claim 1, wherein an axis (Y1) of the volumetric cylinder and an axis (Y2) of the thermal cylinder are arranged substantially perpendicular to each other, and wherein a complementary offset is provided based on the position of the respective connecting crankpins of the first connecting rod assembly of the second connecting rod assembly.

7. The hybrid thermodynamic compressor according to claim 1, wherein the volumetric cylinder is used as a single-acting cylinder, and wherein only the first chamber is used for sucking and discharging while the second chamber operates only in a reciprocating mode with the third chamber through the connection circuit, the inlet path with the first non-return valve and the outlet path with the second non-return valve being coupled to the first chamber.

8. The hybrid thermodynamic compressor according to claim 1, wherein the volumetric cylinder is used as a double-acting cylinder, with the connection circuit which then selectively connects via a valve the second chamber with the third chamber, and wherein a transfer passage is provided from the first chamber to the second chamber, the first chamber being equipped with the inlet path with the first non-return valve, to admit the working fluid at a first pressure,
   the transfer passage comprising a buffer stock volume with a third non-return valve between the first chamber and the buffer stock and a fourth non-return valve between the buffer stock and the second chamber, the outlet path with the second non-return valve being coupled to the second chamber.

9. A thermodynamic boiler, for supplying/removing calories in/from a room of interest, comprising a hybrid thermal compressor according to claim 1, the thermal compressor forming a compression function of a reversible heat pump type loop comprising at least one general working fluid circuit, an expander and at least one outdoor unit.

10. The thermodynamic boiler according to claim 9, said boiler being a cogeneration machine with electricity production, wherein:
    in an electric compression mode, the heat source is deactivated and the electric machine operates as a motor, and
    in a thermal compression mode, the heat source is activated and pulses a reciprocating cycle in the thermal cylinder, the movement of the first piston being imparted by the reciprocating movement of the working fluid in the connection circuit, and in which the connecting rod system transmits only an auxiliary portion of the thermodynamic power and the electric machine operates as a generator.

11. The hybrid thermodynamic compressor according to claim 2, wherein the working fluid is $CO_2$.

12. The hybrid thermodynamic compressor according to claim 1, wherein the thermal cylinder comprises a cylinder sleeve and the fourth chamber is fluidly coupled to the third chamber through a fluid circuit outside the cylinder sleeve via a regenerator.

13. The hybrid thermodynamic compressor according to claim 5, wherein the predetermined angular offset phase shift is substantially equal to 95°.

* * * * *